Nov. 7, 1967   L. R. PADBERG, JR   3,351,901
VISUAL AND ACOUSTIC ENERGY GENERATOR FOR UNDERWATER USE
Filed Jan. 24, 1966

INVENTOR.
LOUIS R. PADBERG JR.

United States Patent Office 3,351,901
Patented Nov. 7, 1967

3,351,901
VISUAL AND ACOUSTIC ENERGY GENERATOR FOR UNDERWATER USE
Louis R. Padberg, Jr., Santa Barbara, Calif., assignor to the United States of America as represented by the Secretary of the Navy
Filed Jan. 24, 1966, Ser. No. 522,793
6 Claims. (Cl. 340—12)

ABSTRACT OF THE DISCLOSURE

Apparatus for detecting and classifying underwater objects by the simultaneous development and propagation toward such an object of both acoustic and visible energy such as might result from the ionization of gas in an enclosure which is in direct contact with the body of water in which the object is immersed. Both forms of energy are directly transferred from the enclosure to the water in timed coincidence, the acoustic energy serving to detect the object and the visible energy aiding in its identification.

---

The invention described herein may be manufactured and used by or for the Government of the United States of America for governmental purposes without the payment of any royalties thereon or therefor.

The present invention relates to a device designed for use below the surface of a body of water, such device being capable of projecting both visible and acoustic energy toward an underwater object for the purpose of detecting and classifying the later.

The problem of providing for the transmission of sound through water over considerable distances is receiving increasing attention due to the necessity of establishing efficient and reliable communication between vessels of various types, as well as for ASW functions. Such equipbent also finds utility in the geophysical industry and to facilitate exploratory activities. However, presently known sound-propagating devices are generelly inadequate in that they have a rather limited range and furthermore are incapable of faithfully transmitting intelligence which recurs at a relatively high frequency.

The above matter is discussed in a co-pending patent application of the present applicant, (S.N. 517,872 filed Dec. 30, 1965, Navy Case No. 40,653). In this co-pending application, the difficulty of achieving reliable results in underwater communication systems is recognized, and it is brought out that the frequency of operation of an underwater sound source should be as low as possible, since, generally speaking, the transmission of acoustic energy through a body of water varies in inverse porportion to its frequency. Broad-band energy is preferable, the lower components being more readily detected at a distance.

One solution proposed in this co-pending application mentioned above resides in the employment of an underwater sound source designed to generate signals having broad-band characteristics, and which can be readily "keyed" so as to permit the transmission of any known type of intelligence, such, for example, as pulses of the type employed in international code. In one embodiment shown in this co-pending application, the acoustic energy is generated by pneumatic means, and the ampltiude of this energy is raised to a high level by incorporating into the apparatus a chamber or enclosure adapted to be set into resonance at its natural frequency of vibration. The design of the equipment is also such that it is capable of withstanding considerable hydrostatic pressure, permitting the entire unit to be lowered, if desired, into the deep sound channel where long-range transmission of the developed sound is possible. Operation is such that, if the intelligence transmision is to be in the form of pulses, both the time duration of each pulse and the time separation therebetween may be selected by an operator stationed upon a surface vessel from which the equipment is suspended.

This disclosure of this co-pending application briefly summarized above is particularly suitable for the transmission of acoustic energy for communication purposes, and, under certain circumstances, may also be useful in detecting, or ascertaining the presence of, objects located below the surface of the ocean. However, another factor arises when the objective sought is the identification and/or classification of an object which has been so detected. The acoustic energy emanated from the sound source, while traveling considerable distances through the liquid medium, nevertheless does not act as a particularly efficient means for determining the nature of any object from which a portion of this energy may be reflected back to the point of transmission.

The transmission of acoustic energy through a body of water for the detection of a target or other object is, at the present time, recognized as the best procedure available. However, as detection ranges constantly increase due to the development of improved sound sources and detecting equipment, the matter of classification or identification of the object once it has been detected remains one of the major unsolved problems, especially in the field of anti-submarine warfare.

A great majority of, if not all, underwater vessels are now equipped with sonar apparatus, but in many cases it is extremely hazardous to employ such apparatus in the vicinity of enemy installations because the location of the vehicle from which the sound is transmitted can frequently be ascertained by direction detecting equipment. Normal sonar apparatus is designed to operate by producing pulses of relatively long time duration, and these pulses are readily picked up by an unauthorized receiver. Although extremely short pulses would be preferable, it has heretofore been difficult to generate such pulses because of the "build-up" time of the projecting equipment. Experimentation has shown that pulses of extremely short duration (having 50,000 watt power) may be emitted by sonar equipment and are extremely difficult to detect by the enemy since such pulses blend in with the sea background noise and are almost incapable of being aurally distinguished, particularly if the rate of transmission of the pulses is varied in random fashion.

The present concept recognizes the problems inherent in carrying out underwater activities such as discussed above, and greatly enhances the capabilities of object detecting and classifying equipment by incorporating thereinto an additional source of energy particularly useful in carrying out the classification function as applied to an object or target the nature of which is unknown. However, rather than employing two distinct devices for generating these two forms of energy, a procedure is made use of in which sound (or acoustic energy) is generated as a direct function of the production of visible light. It has been found that such result can be achieved through the utilization of a closed tube or chamber containing an ionizable gas. If a tube filled with a gas of this nature is placed in direct contact with the water into which the apparatus has been submerged, then the application of an electrical petential to this tube of a nature and amplitude sufficient to produce a gaseous discharge will cause a very intense light to be emitted. At the same time, sound waves are propagated through the water outwardly from the tube surface. By utilizing a suitable reflector, both the light and the acoustic energy can be directed along a common path toward an object to be investigated.

By directly coupling such a gaseous discharge into the water medium, large quantities of energy can be generated and directed along a desired path. Furthermore, the acoustic energy so developed possess broad-band characteristics of a type particularly suitable for detection and classification purposes. It has heretofore been difficult to achieve such acoustic propagation, since the sharpness of any pulse which may be produced by conventional apparatus is limited by the time period necessary to flex a diaphragm or develop motion in a transducer of the ceramic type, for example. The emission of pulses of very short duration from an apparatus such as described above provides a high degree of security from normal aural detection by an enemy since the human ear does not readily respond to pulses of this type. In addition, these short pulses not only have good resolving power but provide improved signal-to-reverberation ratios.

When apparatus of the nature described in the present application is employed, the acoustic energy developed by the apparatus is capable of detecting an object at a considerable distance from the point at which the energy is generated. Once the object has been detected, the vessel upon which the equipment may be mounted approaches the object under investigation and, as soon as the distance between the two becomes short, the visible energy generated by the gaseous discharge tube provides an excellent means whereby visual identification of the object can be accomplished. The detection of small objects by sound alone necessitates that the object be relatively close to the point at which the sound is generated before it can be properly classified. However, the addition of a directional light beam, such as developed by using apparatus of the present application, enables the object to be made visible at considerable distances from the point at which the light is produced. On a submarine, for example, use of equipment such as set forth in the present application enables a target to be located by means of the acoustic energy developed and then, as the object is brought into relatively close proximity to the submarine, the light emitted by the apparatus will illuminate the target and enable it to be seen through the submarine's periscope. The relatively small size and compactness of the apparatus herein set forth renders it uniquely adaptable for portable use, as for example by aqua-lung divers for exploratory purposes.

One object of the present invention, therefore, is to provide an improved apparatus for detecting and classifying underwater objects.

A further object of the invention is to provide an apparatus for the simultaneous development and propagation of both acoustic and visible energy through water toward an object of interest.

A still further object of the invention is to provide means for ionizing a gas in an enclosure which is in direct contact with a body of water, the ionization of this gas acting to develop visible energy in time coincidence with the production of acoustic energy, both forms of energy being directly transferred from the gaseous discharge tube into the water which lies in direct contact therewith.

An additional object of the invention is to provide a combined acoustic and electromagnetic wave generator designed for use beneath the surface of a body of water and capable of producing pulses of acoustic energy having broad-band characteristics.

Other objects advantages and novel features of the invention will become apparent from the following detailed description of the invention when considered in conjunction with the accompanying drawings wherein.

Figure 1:
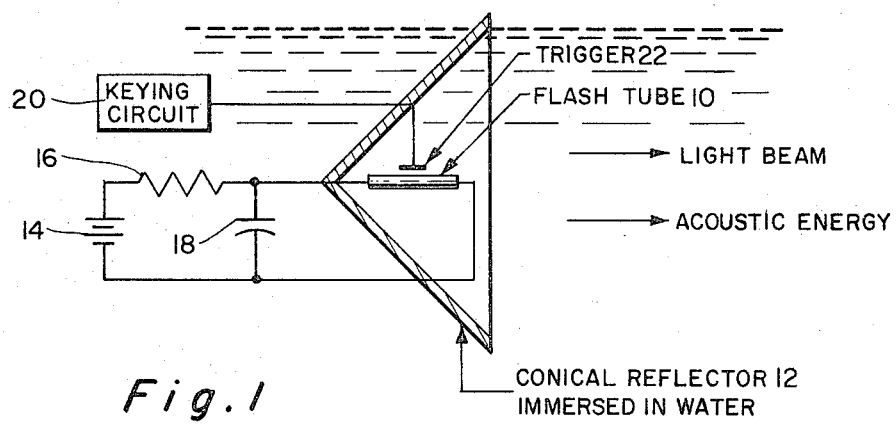
FIG. 1 is a partly schematic showing of one form of apparatus designed in accordance with the principles of the present invention, the energy-reflecting element being shown in section in order to illustrate the assembly details.

Referring now to the drawing, there is shown in FIG. 1 one form of apparatus designed in accordance with the present invention. This apparatus comprises a combined light- and sound-generating device which includes as its primary components a flash tube 10 disposed within a reflecting member 12. Although the configuration of both of these members may vary in accordance with the particular conditions under which the apparatus is designed to operate, the flash tube 10 has been shown in FIG. 1 as being essentially cylindrical or linear, and, for efficiency of operation, the reflector 12 is illustrated as being of the conical type with the tube 10 lying along the center line or axis thereof.

The assembly consisting of the elements 10 and 12 is designed to be immersed in a body of water so that the liquid is in direct contact with the outer surface of the flash tube 10. The latter may be of more or less conventional design, consisting of a closed tube containing an ionizable gas. It is supplied with an ionizing potential from a power source, which, in standard fashion, may comprise a battery or other source of energy 14 associated with a charging resistor 16 and a storage capacitor 18. These components 14, 16 and 18 may or may not be in physical proximity to the reflector 12, since, if desired, they may be carried upon a surface vessel from which the reflector 12 has been lowered. On the other hand, they may be integrated into a single package with the flash tube 10 and its surrounding reflector. In any event, a voltage from the power source 14, 16 and 18 is intended to be constantly applied to the terminals of the flash tube 10 (as shown in the drawing) while the time periods during which the gas is caused to become ionized are controlled by application of a further potential from a keying circuit 20 to a trigger electrode 22 located in close proximity to one wall of the flash tube 10 and acting to induce ionization of the gas contained therewithin whenever an output from the keying circuit is present. Since ionization and de-ionization of the gas within the flash tube 10 occurs within a very short time interval, pulses are developed having sharp or vertical leading and trailing edges. They furthermore should preferably possess a relatively short time duration.

As best shown in FIG. 1 of the drawings, the assembly consisting of the flash tube 10 and reflector 12 lies within a body of water in such fashion that the liquid medium is in direct contact with the outer surface of the flash tube 10. When the flash tube receives a pulse of energy from the keying circuit 20, the gas within the flash tube is ionized. This results in the emission of visible light from the flash tube, and at the same time the production of acoustic energy in the form of a sharp "click." A similar sharp acoustic energy output, or "click," is developed upon de-ionization of the gas in the flash tube 10, and occurs simultaneously with the trailing edge of a pulse developed by the keying circuit 20. In other words, two short bursts of acoustic energy are generated for each "cycle" of ionization of the flash tube 10, one such energy burst occurring in time coincidence with the ionization of the gas in the flash tube, and the other acoustic energy burst occurring in time coincidence with the de-ionization of such gas. This sonic energy lies generally in a frequency band extending from 8 to 80 kc.

Inasmuch as the flash tube 10 is in direct contact with the liquid (such as seat water) into which the assembly of FIG. 1 has been immersed, the energy, both visual and acoustic, developed by energization of the flash tube 10 will be transmitted into the water surrounding the flash tube. Since it is desired to "beam" this energy in a single direction (such as indicated in the drawing by the arrows) the reflector 12 is positioned to partially surround the flash tube in the manner illustrated. This reflector 12 is of conical shape, with the flash tube 10 lying essentially on the center line or axis thereof so that the energy impinging the inner wall of the conical reflector 12 is propagated in the direction of the arrows—that is, horizontally to the right in the drawing. As above brought out, the sound waves thus developed and directionally oriented are capable of traveling considerable distances through the water, and facilitate the discovery of any particular object of interest.

Figure 2:
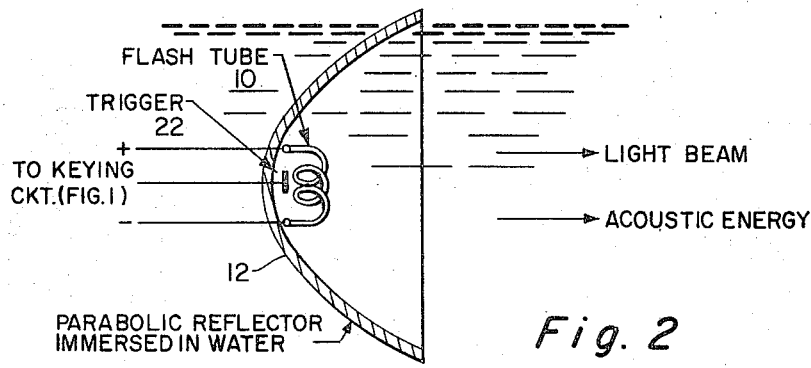
FIG. 2 is a modification of the device of FIG. 1, utilizing a parabolic rather than a conical reflector, along with a different configuration for the tube in which the ionizable gas is contained.

The arrangement illustrated in FIG. 1 of the drawings is especially adapted for employment when the flash tube 10 is of essentially cylindrical configuration, or, in other words, of pencil-like shape. However, if it is desired to utilize a flash tube of helical form, then the arrangement of FIG. 2 is preferable. In this figure, the flash tube 10 consists of a number of convolutions centered about a point which coincides with the focus of the reflector 12. The latter is now made parabolic in shape in order to direct the energy along a common path in the manner of FIG. 1 of the drawings. One advantage obtained by using the convoluted design of FIG. 2 is that the length of the flash tube may be increased over that feasible when utilizing the arrangement of FIG. 1, and hence a greater amount of both light energy and acoustic energy may be produced thereby. However, the principle of operation of the devices shown in FIGS. 1 and 2 of the drawings is identical.

Under certain circumstances, it is desired that light be propagated for a considerable distance through a liquid medium in order to more readily classify an object which has been detected by the emitted acoustic energy. In such cases, the arrangement of FIG. 3 of the drawings is particularly suitable. Instead of a single flash tube being utilized, four flash tubes are symmetrically arranged about an axis, and, coinciding with the latter, there is located a high-intensity light source in the form of a rod or cylinder 24 having the optical properties of a laser and producing a very narrow beam of light. In such an arrangement, periodic energization of the flash tubes in the manner set forth in connection with FIGS. 1 and 2 of the drawings will cause the laser 24 to be excited to a point where radiation will be emitted therefrom in a selected portion of the frequency spectrum, the particular portion in which radiation occurs being determined by the design of the laser. Ordinarily, however, light emission in the blue-green region of the spectrum is preferable.

Figure 3:
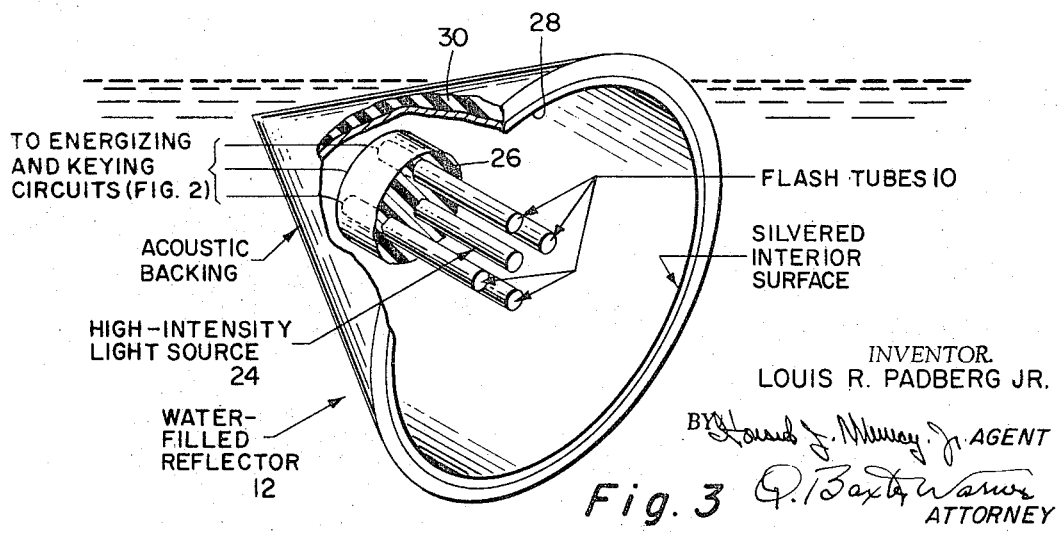
FIG. 3 is a still further modification of FIG. 1, in which a plurality of ionizable tubes are utilized and disposed so as to partially encircle a further source of high-intensity visible energy.

The flash tubes 10 of FIG. 3 as well as the laser or other high-intensity light source 24 are embedded for a portion of their length in some plastic material 26 which serves to maintain the relative position of these components with respect to one another and also with respect to the water-filled reflector 12. The manner in which the flash tubes 10 are energized in FIG. 3 of the drawings is identical to that of FIGS. 1 and 2. It is only necessary that a sufficient number of flash tubes 10 be utilized so that the output thereof reaches an amplitude sufficient to activate the light source 24.

The reflectors of FIGS. 1, 2 and 3 preferably have the interior surface thereof coated with some material which is highly light-reflective, such, for example, as a thin coating 28 of silver FIG. 3). On the other hand, it is desired that the acoustic energy developed by the assembly be precluded from traveling in other than the desired direction, and hence each reflector preferably has its rear surface covered with a layer 30 of some material which is relatively impervious to sound energy, such as unicellular rubber.

Not only are the pulses developed by applicant's arrangement capable of being of such short time duration that they are difficult to detect by unauthorized receivers, but, in addition, such short pulses permit the target or other object under investigation to be more accurately resolved than is possible when the pulses are of a fairly long nature. This is a considerable advantage when visibility is limited, as is the case when the water is murky or under abnormal environmental conditions.

It will be recognized that an essential factor in applicant's concept consists in directly coupling acoustic energy into a body of water, this acoustic energy being generated as a direct result of, and simultaneously with, the production of electromagnetic energy in the visible portion of the frequency spectrum. Since the flash tube or tubes of the embodiments shown are completely surrounded by a liquid medium, efficiency of coupling is extremely high, and less energy is lost in the transfer process. Furthermore, this method of direct coupling of energy yields great savings in both weight and size as compared to conventional transducing mechanisms of a type now known in the art. Inasmuch as both the power supply and the keying equipment may be located on board a vessel from which the reflector and flash tube have been lowered, the actual weight of that portion of the apparatus below the surface of the water may be extremely low, and can be handled by a minimum of equipment. When the apparatus herein disclosed is located on board a submarine or other underwater vessel, the weight and size savings are of even greater importance, and serve to extend the range over which the submarine can operate as well as adding to its maneuverability. Furthermore, the equipment herein disclosed is simple in design and reliable in operation, since no moving parts are involved. Furthermore, it can remain below the surface of a body of water for extended periods without requiring maintenance or repair.

Obviously many modifications and variations of the present invention are possible in the light of the above teachings. It is therefore to be understood that within the scope of the appended claims the invention may be practiced otherwise than as specifically described.

I claim:
1. Apparatus for ascertaining the presence of an under water object and for facilitating the identification thereof, said apparatus comprising:
   selectively energizable electro-responsive means, designed for immersion into a body of water so as to lie in direct contact therewith, for periodically generating electromagnetic energy in the visible portion of the frequency spectrum and for additionally producing an output of acoustic energy at both the instant of initiation of each period of electromagnetic energy generation and at the instant of termination of each such period;
   means for selectively energizing said electro-responsive means; and
   means for directing both the electromagnetic energy generated by said electro-responsive means and the acoustic energy produced thereby along a common path toward said object, the acoustic energy so directed acting primarily to ascertain the presence of said object and the electromagnetic energy so directed acting primarily to facilitate its identification;
   said electro responsive means comprising a tube containing therewithin an ionizable gas.

2. Apparatus according to claim 1 in which said directing means includes an energy reflector partially surrounding said tube.

3. Apparatus according to claim 2 in which said energy reflector is of conical form and said tube is of cylindrical configuration, with the latter lying along the axis of said reflector.

4. Apparatus according to claim 2 in which said energy reflector is of parabolic form and said tube is of helical configuration, with the latter being centered about the focal point of said reflector.

5. Apparatus for ascertaining the presence of an underwater object and for facilitating the identification thereof, said apparatus comprising:
   selectively energizable electro-responsive means, designed for immersion into a body of water so as to lie in direct contact therewith, for periodically generating electromagnetic energy in the visible portion of the frequency spectrum and for additionally producing an output of acoustic energy at both the instant of initiation of each period of electromagnetic energy generation and at the instant of termination of each such period;

means for selectively energizing said electro-responsive means; and means for directing both the electromagnetic energy generated by said electro-responsive means and the acoustic energy produced thereby along a common path toward said object, the acoustic energy so directed acting primarily to ascertain the presence of said object and the electromagnetic energy so directed acting primarily to facilitate its identification;

said directing means including a reflector of conical form, and said electro-responsive means including a plurality of flash tubes of cylindrical configuration disposed symmetrically in spaced-apart relation about the axis of said conical reflector, further comprising a source of high-intensity light located in substantial coincidence with the axis of said conical reflector and adapted to be energized as a function of the concurrent energization of said plurality of flash tubes.

6, Apparatus according to claim 5 in which said source of high-intensity light is a laser.

References Cited

UNITED STATES PATENTS

| | | | |
|---|---|---|---|
| 1,152,697 | 9/1915 | Bodde | 340—12 |
| 3,007,133 | 10/1961 | Padberg | 340—12 |

OTHER REFERENCES

Early et al.: "Communication and Electronics," January 1956, pp. 788–790.

RODNEY D. BENNETT, *Primary Examiner.*

RICHARD A. FARLEY, *Examiner.*